United States Patent [19]

Ikegaya et al.

[11] Patent Number: 5,437,016
[45] Date of Patent: Jul. 25, 1995

[54] APPARATUS AND METHOD FOR TRANSLATING LOGICAL ADDRESSES FOR VIRTUAL MACHINES

[75] Inventors: Hiroshi Ikegaya, Sagamihara; Hidenori Umeno, Tsukui; Tsuyoshi Watanabe, Hadano, all of Japan

[73] Assignee: Hitachi, Ltd., Tokyo, Japan

[21] Appl. No.: 909,308

[22] Filed: Jul. 6, 1992

[30] Foreign Application Priority Data

Jul. 5, 1991 [JP] Japan .................................. 3-165357

[51] Int. Cl.⁶ ........................ G06F 12/00; G06F 12/06
[52] U.S. Cl. .............................. 395/400; 364/DIG. 1
[58] Field of Search .................................. 395/400, 425

[56] References Cited

U.S. PATENT DOCUMENTS

| | | | |
|---|---|---|---|
| 4,456,954 | 6/1984 | Bullions, III et al. | 395/400 |
| 4,459,661 | 7/1984 | Kaneda et al. | 395/400 |
| 4,695,950 | 9/1987 | Brandt et al. | 395/400 |
| 4,733,350 | 3/1988 | Tone et al. | 395/400 |
| 4,802,084 | 1/1989 | Ikegaya et al. | 395/400 |
| 4,816,991 | 3/1989 | Watanabe et al. | 395/400 |
| 4,843,541 | 6/1989 | Bean et al. | 395/275 |
| 5,101,346 | 3/1992 | Ohtsuki | 395/800 |
| 5,129,071 | 7/1992 | Yamagata et al. | 395/400 |
| 5,230,069 | 7/1993 | Brelsford et al. | 395/400 |

Primary Examiner—Jack B. Harvey
Assistant Examiner—Michael A. Whitfield
Attorney, Agent, or Firm—Antonelli, Terry, Stout & Kraus

[57] ABSTRACT

An absolute address translated from a logical address input by a user program by an address translation circuit and a prefix translation circuit, is compared with contents of a virtual processor prefix register. On the basis of the comparison result, a multi-processor field of a translation lookaside buffer (TLB) has a value indicating whether or not the entry corresponds to an area common among virtual processors. The MP field of the TLB is compared with contents of the multi-processor register, and a virtual processor field of the TLB is compared with contents of a virtual processor register. If the value coincides with the multi-processor field or if the value does not coincide with the multi-processor field and the value coincides with the virtual processor field, contents of an absolute address field of the TLB are input to an absolute address register. This increases the effective capacity and utilization of the TLB to avoid decreasing of performance of the virtual machines.

11 Claims, 7 Drawing Sheets

APPARATUS AND METHOD FOR TRANSLATING LOGICAL ADDRESSES FOR VIRTUAL MACHINES

BACKGROUND OF THE INVENTION

1. Field of the Invention

The present invention relates to an apparatus and method for translating logical addresses for virtual machines. More particularly, it relates to an address translator and address translation process effective for virtual machines of multi-processor type comprising a plurality of virtual processors.

2. Description of the Prior Art

An address translation function is a function for easy and efficient performance of dynamic relocation of a program and a function for efficient translation of a logical address to a real address together with an operating system for supporting a virtual storage. The dynamic relocation is usually performed if capacity of the program to be executed is larger than that of a main storage actually provided. The address translation is performed if an address given by the program is treated as a logical address, The logical address that accesses a storage is translated to a real address for designating a position of a real storage actually provided.

The multi-processor system includes has a plurality of processors which share the same main storage to exchange information under control of a single operating system. In order to make the multi-processor system share the same main storage, it have to has prefix areas that are different from one another in the main storage. The prefix areas are areas that store information specific to the respective processors, including channel status words for I/O control, channel address words, and new and old PSWs for interrupt controls. The multi-processor system has a prefix register provided therein, as shown in FIG. 2, to perform address-translation of the logical address issued from the program to real address and in turn to prefix-translate the real address to an absolute address which is an actual main storage access address. The prefix translation includes the following three types.

(1) For the real address access to page 0, the address indicted by contents of the prefix register is the absolute address.

(2) If the real address is the same as the contents of the prefix register and the real address, the address accessing to page 0 is the absolute address.

(3) If the real address does not access to page 0 and is not the same as the contents of the prefix register, the real address is the absolute address.

In a multi-processor system having two processors, as an example, a processor 0 has a prefix register value of "0" and a processor 1 has a prefix register value of "$\alpha$," as shown in FIG. 3. The processor 0 translates real address 0 to absolute address 0 and real address $\alpha$ to absolute address $\alpha$, and the processor 1 translates real address 0 to absolute address $\alpha$ and real address $\alpha$ to absolute address 0.

In general, a translation lookaside buffer (TLB) has the absolute addresses put therein to correspond to the logical addresses to perform faster address translation. As the multi-processor system has one TLB in each processor, the TLB has a result of the prefix translation put therein which is made with use of the prefix register of the respective processor.

The virtual computer system used herein is a control system for performing control as if a plurality of computers (machines) exist and are controlled by a single real machine, which includes processors, a real storage, a channel, and I/O units. In the virtual machine system, of course, the main storage and I/O units are arranged so that a number of operating systems can be run in the single real machine at the same time to share all the resources such as the processors. For the multi-processor system of a virtual machine, the whole multi-processor system in the real machine corresponds to the virtual machines, and the processors of the real machine correspond to virtual processors of the virtual machine. The multi-processor system of virtual machines has to have a TLB entry for each of the virtual processors as each processor of the real machine has only one TLB.

A conventional system of the type described, for example, in the IBM System/370, Extended Architecture, Interpretive Execution. SA22-7095-1, p2 and pp18–19, is intended for providing a multi-processor system in which guests (virtual machines) can share the main storage. Each of the guest CPUs (virtual processors) is defined by an independent state description. Guest type TLB entries are made different depending on the environmental information of the guests. The environmental information of the guests includes the state description. That is, the virtual machine is made as a multi-processor system comprising a plurality of virtual processors, and each virtual processor has a different TLB entry. It is possible to identify all areas, including the prefix areas corresponding to the virtual processors.

If the conventional system described above should be made as the multi-processor system in which any of the virtual machine comprises a plurality of virtual processors, the prefix area of each virtual processor is identified so that the TLB entries for all of the areas, including the prefix areas, are made different specifically for the virtual processors. This eventually results in that a different TLB entry for any of the areas (common among the virtual processors) other than the prefix areas is put in the TLB for each of the specific virtual processors irrespective of the fact that the information other than the ones identifying the virtual processors are identical. In addition, the TLB is occupied by the TLB entry for the area common among the virtual processors as the TLB entry for the prefix area needs a single entry for each virtual processor. As a result, the TLB is excessively occupied by the redundant TLB entry. This decreases efficiency of the TLB, which lowers performance of the virtual machine.

SUMMARY OF THE INVENTION

In view of such a conventional problem that the TLB entry for the areas common among the virtual processors is put in the TLB as the TLB entry which is different for each of the virtual processors, resulting in excessive occupation of the TLB, an object of the present invention is to provide an apparatus for translating logical addresses for virtual machines so that entry of the prefix area of each virtual processor can be put in the TLB, and the TLB entry for the area common to the virtual processors can be used in common among the virtual processors to increase the effective capacity and utilization of the TLB to avoid decreasing the performance of the virtual machines.

Briefly, the foregoing object is accomplished in accordance with aspects of the present invention by the address translator for virtual machines that consists of at least one unit of a virtual machine of the multi-processor type having a plurality of virtual processors. The address translation holds a logical address of the virtual machine, has a translation look-aside buffer (TLB) for holding a pair of translators for translating the logical address to an absolute address of a real machine, stores a value for indicating whether or not entry corresponds to an area common among the plurality of the virtual processors and has a value for identifying any of the virtual processors forming the multi-processor, and for translating a real address of any of the virtual machines to a absolute address of the virtual machine, translates a logical address of any of the virtual machines to a real address of the virtual machine by comparing a prefix value of any of the virtual processors input according to a system program with the absolute address obtained by the prefix translation means, and validates on the basis of comparison results by the comparison means, the entry for the area common among the plurality of the virtual processors.

The present invention in the construction described above preferably has further features for holding a value for identifying a currently running virtual machine and a value for identifying a currently running virtual processor, for comparing the value for identifying the virtual machine with the MP field of the TLB for identifying the virtual machine, for comparing the value for identifying the currently running virtual processor with the VP field of the TLB for identifying any of the virtual processors, and for validating the TLB entry.

Also, the foregoing object is accomplished in accordance with aspects of the present invention by the address translation process for virtual machines in a virtual machine system comprising at least one unit of a virtual machine of multi-processor type having a plurality of virtual processors. The address translation process is for translating a logical address of the virtual machine to an absolute address of a real machine. The address translation process is accomplished by translating the logical address of e virtual machine to the absolute address of the virtual machine by address translation means for translating the logical address of the virtual machine to real address of the virtual machine and prefix translation means for translating the real address of the virtual machine to the absolute address of the virtual machine; in comparing a prefix value for each of the virtual processors input according to a system program with the translated absolute address; inputting, to a translation look-aside buffer (TLB) a value for indicating that entry is for an area common among the virtual processors if the prefix value and the translated absolute address do not coincide as compared above; and inputting, to the TLB, a value for indicating that entry is not for the area common among the virtual processors if the prefix value and the translated absolute address coincide.

The present invention in the process described above preferably includes the further steps of comparing a value for identifying a currently running virtual machine with a multi-processor field of the TLB, as assigned by a control program for controlling the virtual machine system; comparing a value for identifying a currently running virtual processor with a virtual processor field of the TLB, as assigned by the control program; and making effective an entry of the TLB if the value for identifying the virtual machine coincides with the multi-processor field of the TLB or if the value for identifying the virtual machine does not coincide with the multi-processor field of the TLB and the value for identifying the virtual processor coincides with the virtual processor field of the TLB.

In operation, the present invention can be outlined as follows. In the address translator of the present invention, the multi-processor field of the TLB can make different indications of the TLB entry for the area common among the virtual processors comprising the multi-processor of the virtual machine and of the TLB entry for the prefix area corresponding to each of the virtual processors. The feature that set a value identifying any of the virtual machines and indicating whether or not entry is for the area common among the virtual processor, can also input to in the TLB the entry for the area common among the virtual processors and the entry for the prefix area for each virtual processor. The feature that holds the prefix value of each virtual processor and the feature that compares the prefix value held by the holding feature with the absolute address obtained by the prefix translation feature, can validate that the entry input to the TLB is for the prefix area of the virtual processor.

The feature that holds the value the identifying the currently running virtual machine and the value identifying the currently running virtual processor, the feature that compares the value identifying the virtual machines with the multi-processor field of the TLB, and the feature that compares the value identifying the virtual processor with the virtual processor field of the TLB, can validate that the entry input of the TLB is for the currently running virtual processor of the currently running virtual machine. The feature that validates the TLB entry, can validate that the TLB has preformed address translation for the area common among the virtual processors or any of the prefix areas corresponding to the virtual processors.

The address translation process of the present invention can compare the prefix value for each of the virtual processors input with the translated absolute address, and if the prefix value and the translated absolute address coincide, input to the TLB the value indicating that the entry is not for the area common among the virtual processors. This allows inputting of the TLB entry for the area common among the virtual processors and the TLB entry of the prefix area of each virtual processor.

If the value for identifying the virtual machine coincides with the multi-processor field of the TLB or if the value for identifying the virtual machine does not coincide with the multi-processor field of the TLB, and the value for identifying the virtual processor coincides with the virtual processor field of the TLB, the entry of the TLB can be made effective. This means that the TLB has performed the address translation for the area common among the virtual processors or the prefix area corresponding to each virtual processor.

The process described above allows the TLB to have the entry for the area common among the virtual processors and the entry for the prefix area of each virtual processor input therein differently so that the entry for the area common among the virtual processors can be used in common among the virtual processors. Thus, the present invention described above has the advantage that the effective capacity and utilization of the TLB can be increased to avoid decreasing the performance of the virtual machines.

The foregoing and other objects, advantages, manner of operation and novel features of the present invention will be understood from the following detailed description when read in connection with the accompanying drawings.

BRIEF DESCRIPTION OF THE DRAWINGS

Other objects and advantages of the present invention will further become apparent thereinafter and in the drawings in which.

DETAILED DESCRIPTION OF THE PREFERRED EMBODIMENTS

Figure 4:
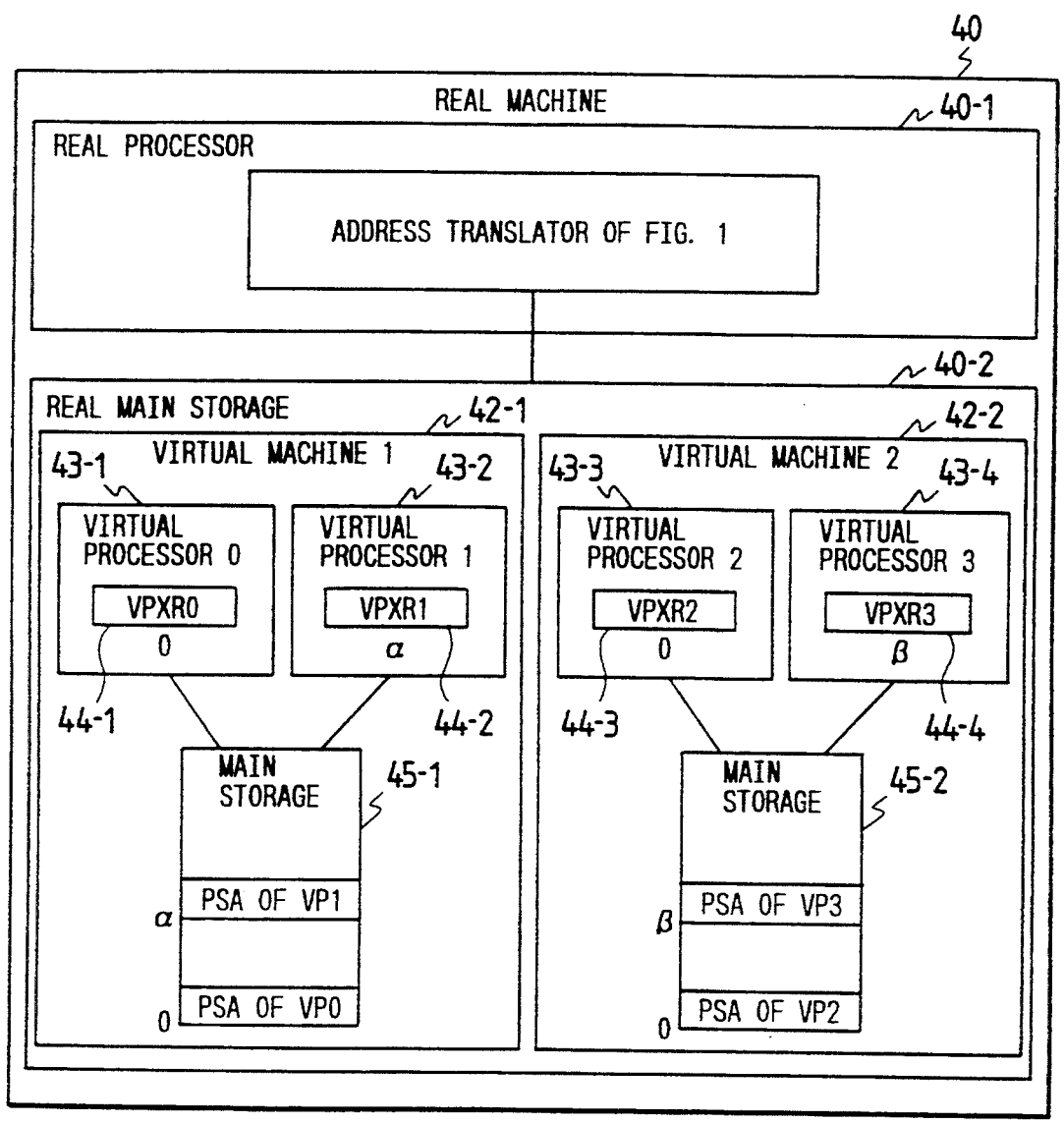
FIG. 4 is a configuration illustrating that virtual machines are allocated in a real machine.

The present invention is illustrated in further detail by reference to the accompanying drawings. FIG. 4 is a configuration illustrating, that virtual machines are allocated in a real machine. In the figure, a virtual machine 1 42-1 and a virtual machine 2 42-2 run on a real main storage 40-2 in the real machine 40. The virtual machine 1 42-1 is formed as a multi-processor consisting of two processors, including a virtual processor 0 (VP0) 43-1 and a virtual processor 1 (VP1) 43-2. Similarly, the virtual machine 2 42-2 is formed as a multi-processor. Each of the virtual processors has a prefix register. As an example, the prefix register (VPXR0) 44-1 of the virtual processor 0 (VP0) 43-1 has "0" stored therein, and the prefix register (VPXR1) 44-2 of the virtual processor 1 (VP1) 43-2 has "α". In this case, on a main storage 45-1 of the virtual machine 1 42-1, a prefix area (PSA) of the virtual processor 0 (VP0) 43-1 has address 0, and a prefix area (PSA) of the virtual processor 1 (VP1) 43-2 has address α. Similarly, as an example, the prefix register (VPXR2) 44-3 of the virtual processor 2 (VP2) 43-3 has "0" stored therein, and the prefix register (VPXR3) 44-4 of the virtual processor 3 (VP3) 43-4 has "β". In this case, on a main storage 45-2 of the virtual machine 2 42-2, a prefix area (PSA) of the virtual processor 2 (VP2) 43-3 has address 0, and a prefix area (PSA) of the virtual processor 3 (VP3) 43-4 has address β.

Table 1 is a chart showing values for identifying a virtual machine for a running virtual machine, values for identifying a virtual processor, and values to be put in TLB.

In the configuration in FIG. 4, for identification of the virtual machines, the virtual machine 1 has "1" assigned thereto, and the virtual machine 2 has "2" assigned thereto. For identification of the virtual processors, the virtual processor 0 has "0" assigned thereto and, similarly the virtual processors 1, 2, and 3 have "1", "2", and "3" assigned thereto respectively. The multi-processor (MP) field of the TLB has "0" stored if an entry is input for the prefix area of each of the virtual processors. It has a value stored for identifying the virtual machine if it has an entry input for the area common among the virtual processors.

As an example, consider operation of the virtual processor 0 (VP0). As shown in Table 1, the value for identifying the virtual computer corresponding to the virtual machine 1 is "1" and the value for identifying the virtual machine corresponding to the virtual processor 0 is "0". If entry of the virtual processor 0 is put in the TLB, the multi-processor (MP) field of the TLB has "0" input and the virtual processor (VP) field has "0" input for the entry of the prefix area of the virtual processor 0. The multi-processor (MP) field of the TLB has "1" input and the virtual processor (VP) field has "0" input for the entry of the common area among the virtual processors.

TABLE 1

| Running virtual machine<br>Running virtual processor | Virtual machine 1 | | Virtual machine 2 | |
|---|---|---|---|---|
| | VP0 | VP1 | VP2 | VP3 |
| Value for identifying virtual machine | 1 | 1 | 2 | 2 |
| Value for identifying virtual processor | 0 | 1 | 2 | 3 |
| Multi-processor field of TLB | 0 or 1 | 0 or 1 | 0 or 2 | 0 or 2 |
| Virtual processor field of TLB | 0 | 1 | 2 | 3 |

Figure 1:
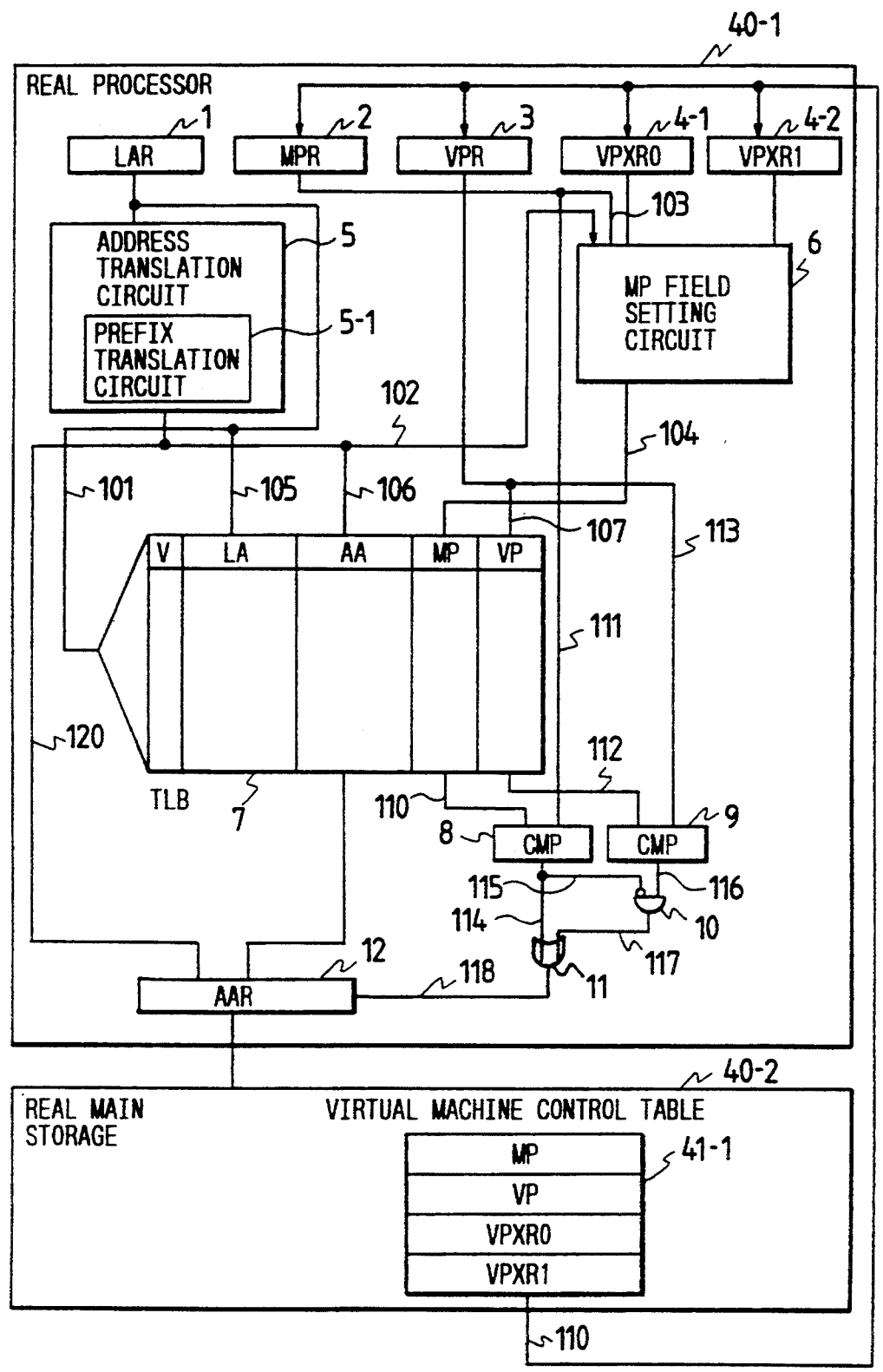
FIG. 1 is a configuration of an embodiment of the address translator according to the present invention.
Figure 2:
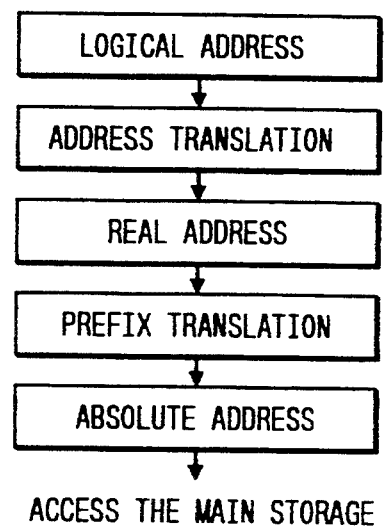
FIG. 2 shows that the logical address issued from the program is translated by an address-translator to a real address and in turn by prefix-translator to an absolute address which is an actual main storage access address.
Figure 3:
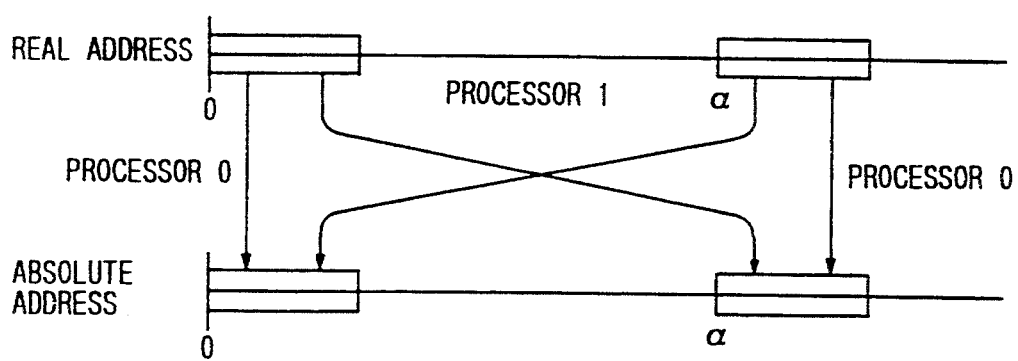
FIG. 3 shows that in a multi-processor system having two processors, as an example, a processor 0 has a prefix register value of "0" and a processor 1 has a prefix register value of "α," the processor 0 translates real address 0 to absolute address 0 and real address α to absolute address α, and the processor 1 translates real address 0 to absolute address α and real address α to absolute address 0.

FIG. 1 is a configuration of an embodiment of the address translator according to the present invention.

The address translator comprises a logical address register (LAR) 1, a multi-processor register (MPR) 2, a virtual processor register (VPR) 3, virtual prefix registers (VPXR0 and VPXR1) 4-1 and 4-2, an address translation circuit 5, a prefix translation circuit 5-1, a MP field setting circuit 6, a translation lookaside buffer (TLB) 7, comparators (CMP) 8 and 9, an AND circuit 10, an OR circuit 11, and an absolute address register (AAR) 12.

The address translator operates as follows. The logical address register (LAR) 1 has a logical address stored therein as issued by a program. The multi-processor register (MPR) 2 has a value for identifying a currently running virtual machine stored therein from a virtual machine control table 41-1 upon start of the virtual machine. The virtual processor register (VPR) 3 has a value for identifying a currently running virtual processor stored therein from a virtual machine control table 41-1 upon start of the virtual machine. The virtual processor prefix registers 4-1 and 4-2 have values of the prefix registers of the virtual processors forming the currently running virtual machine stored therein from a virtual machine control table 41-1 upon start of the virtual machine.

Entries of translation look-aside buffer (TLB) 7 are located with the logical address stored in the logical address register (LAR) 1, through a data line 101. If the entry associated with the logical address is not in the TLB, the address translation circuit 5 executes address translation, and the prefix translation circuit 5-1 executes prefix translation. The absolute address obtained is input to the MP field setting circuit 6 through a data line 102. It also is input to the absolute address register (AAR) 12 through a data line 120. The MP field setting circuit 6 compares the absolute address on the data line 102 with contents of the virtual processor prefix registers 4-1 and 4-2. If the absolute address coincides with any of the contents of the registers, a data line 104 outputs a value (for example, "0") indicating the prefix area of the virtual processor. If not, the data line 104 outputs contents of the multi-processor register (MPR) 2. For the entry associated with the logical address stored in the logical address register (LAR) 1, the TLB 7 has parts of the logical address register (LAR) 1 input to an LA field thereof through a data line 105, the absolute address obtained by the address translation circuit 5 input an AA field through a data line 106, the value "0" indicating the prefix area of the virtual processor output by the MP field setting circuit 6 or contents of the multi-processor register (MPR) 2 input to an MP field thereof through data line 104, and contents of the virtual processor register (VPR) 3 input to a VP field thereof through data line 107.

When the TLB 7 is hit, the comparator 8 has the MP field of the TLB 7 input thereto through a data line 110. The comparator 8 also has contents of the multi-processor register (MPR) 2 input thereto through a data line 111. The comparator 8 compares both data and if they coincide, it outputs "1" through signal lines 114 and 115. If not, it outputs "0" through the signal lines 114 and 115. The comparator 9 has the! VP field of the TLB 7 input thereto through a data line 112. The comparator 9 also has contents of the virtual processor register (VPR) 3 input thereto through a data line 113. The comparator 9 compares both data and if they coincide, it outputs "1" through a signal line 116. The AND circuit 10 outputs "1" to a signal line 117 if the signal line 115 is "0" and the signal line 116 is "1". The OR circuit 11 outputs "1" to a signal line 118 if either of the signal lines 114 or 117 is "1". The AA field of the TLB 7 is input to the absolute address register (AAR) 12 if the signal line 118 is "1". This means that the address translation has been executed by the TLB.

The embodiment of the present invention described above has the advantage that the effective capacity and utilization of the TLB can be increased to avoid decreasing performance of the virtual machines, as the entry of the prefix area of each virtual processor can be input to the TLB, and the TLB entry for the area common to the virtual processors can be used in common among the virtual processors.

Figure 5:
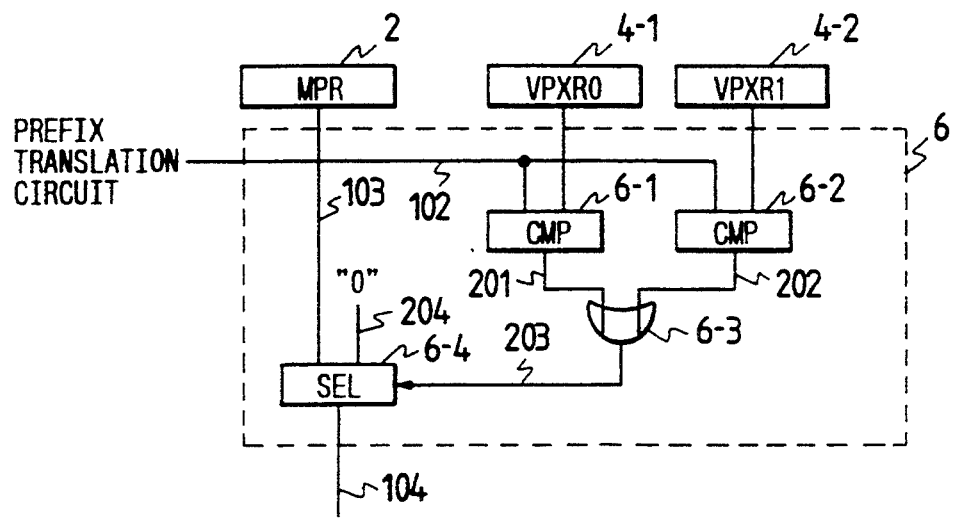
FIG. 5 is a block diagram for an embodiment of the MP field setting circuit 6 in FIG. 1.

FIG. 5 is a block diagram for an embodiment of the MP field setting circuit 6 in FIG. 1. The MP field setting circuit 6 comprises comparators (CMP) 6-1 and 6-2, and an OR circuit 6-3, a selector (SEL) 6-4. The following describe operation of the MP field setting circuit 6.

The absolute data obtained by the prefix translation circuit 5-1 is input to the comparators 6-1 and 6-2 through the data line 102. The contents of the virtual processor prefix register 4-1 of the virtual processor 0 (VP0) 43-1 are input to the comparator 6-1, and the contents of the virtual processor prefix register 4-2 of the virtual processor 1 (VP1) 43-2 are input to the comparator 6-2. The comparators 6-1 and 6-2 compare the absolute address with the values in the prefix registers of the virtual processors and if these coincide, they output "1" through signal lines 201 and 202, respectively. An OR circuit 6-3 outputs "1" to a signal line 203 if either of the signal lines 201 or 203 is "1". A selector 6-4 outputs to the data line 104 the contents of the multi-processor register 2 on the data line 103 if the signal line 203 is "0", or it outputs to the data line 104 the "0" on the data line 204 if the signal line 203 is "1". This allows outputting to the data line 104 the value (contents of the multi-processor register) for identifying the virtual machine if the absolute address put in the TLB 7 is for the area common among the virtual processors, or outputting to the data line 104 the value ("0") indicating the area that is not common among the virtual processors if the absolute address put in the TLB 7 is for the prefix areas of the virtual processors.

Figure 6:
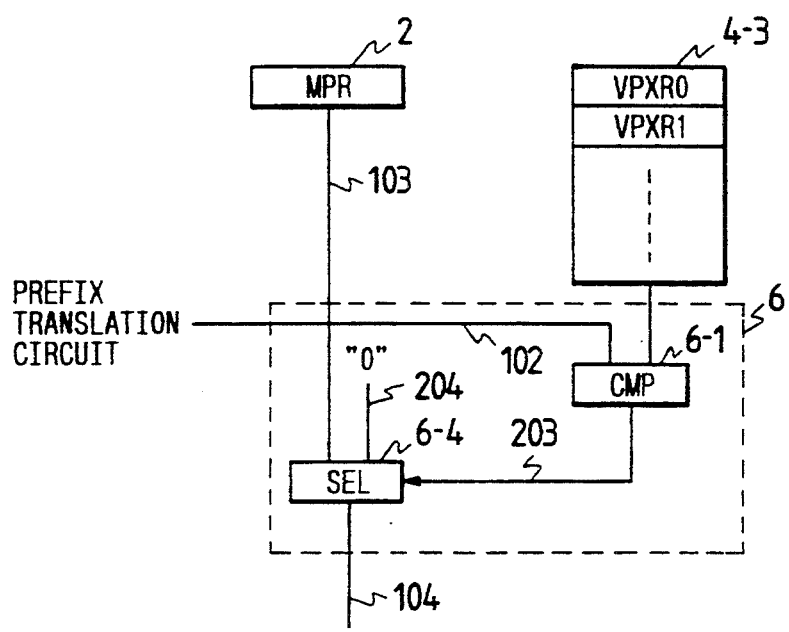
FIG. 6 is a block diagram for another embodiment of the MP field setting circuit 6.

FIG. 6 is a block diagram for another embodiment of the MP field setting circuit 6. The MP field setting circuit 6 in the figure comprises a virtual processor prefix register stack 4-3, a comparator 6-1, and a selector (SEL) 6-4. The following describe operation of the MP field setting circuit 6.

A virtual processor prefix register stack 4-3 has values of the prefix registers of the virtual processors stacked therein. A comparator 6-1 has the absolute address obtained by the prefix translation circuit 5-1 input thereto through the data line 102. It also has contents of the virtual processor prefix register stack 4-3 input thereto. It compares the absolute address with the values of the prefix registers of the virtual processors. If any of the values coincides with the absolute value, the comparator 6-1 outputs "1". If not, it outputs "0". A selector 6-4, as described above, outputs to the data line 104 the contents of the multi-processor register 2 on the data line 103 if a signal line 203 is "0", or it outputs to the data line 104 the "0" on a data line 204 if the signal line 203 is "1".

With use of the embodiment described above, the MP field setting circuit 6 can be made up with the single comparator irrespective of number of the virtual processors.

Figure 7:
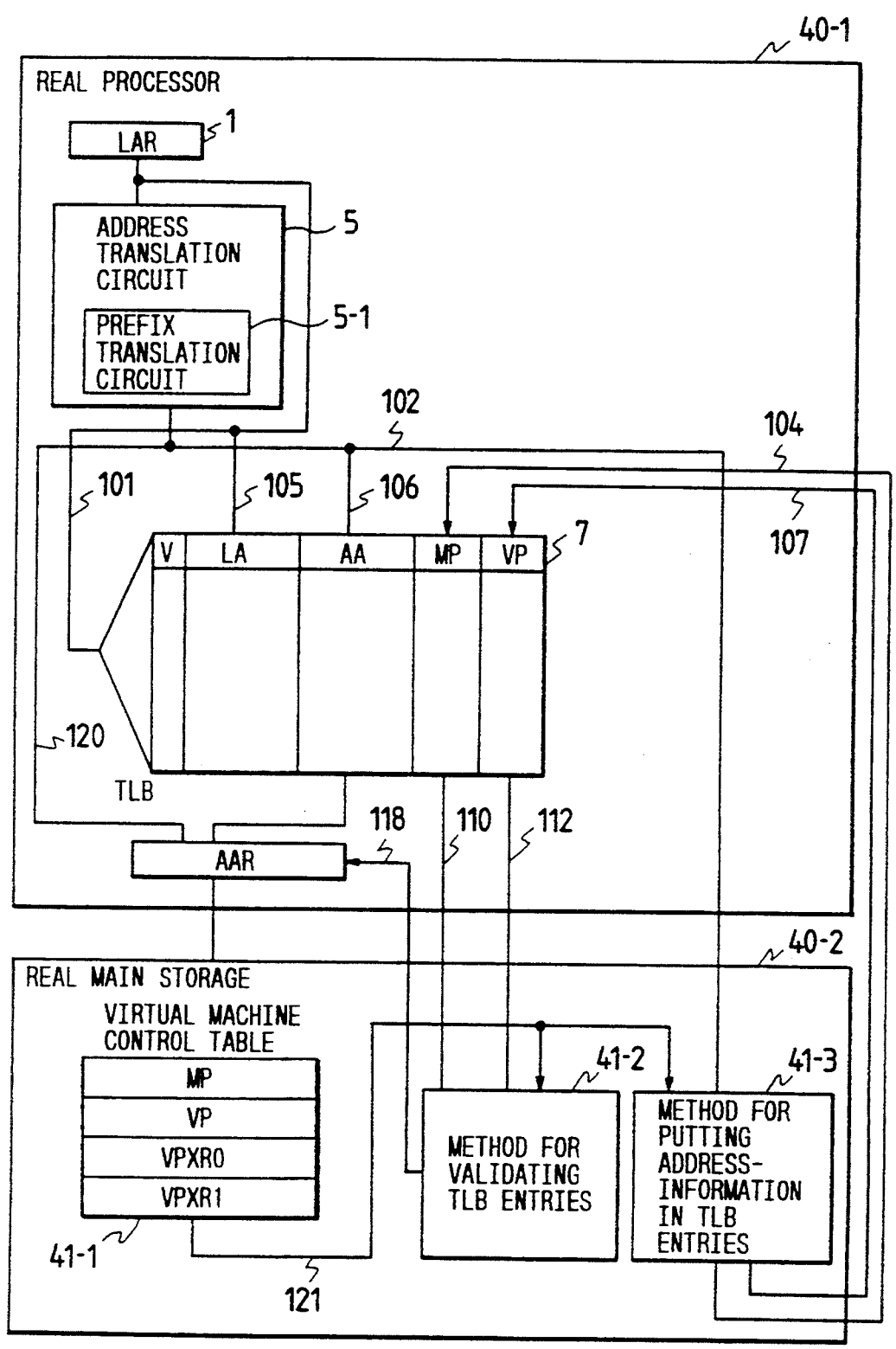
FIG. 7 is a block diagram for the address translator operating in the address translation method in view of the second concept described previously.
Figure 8:
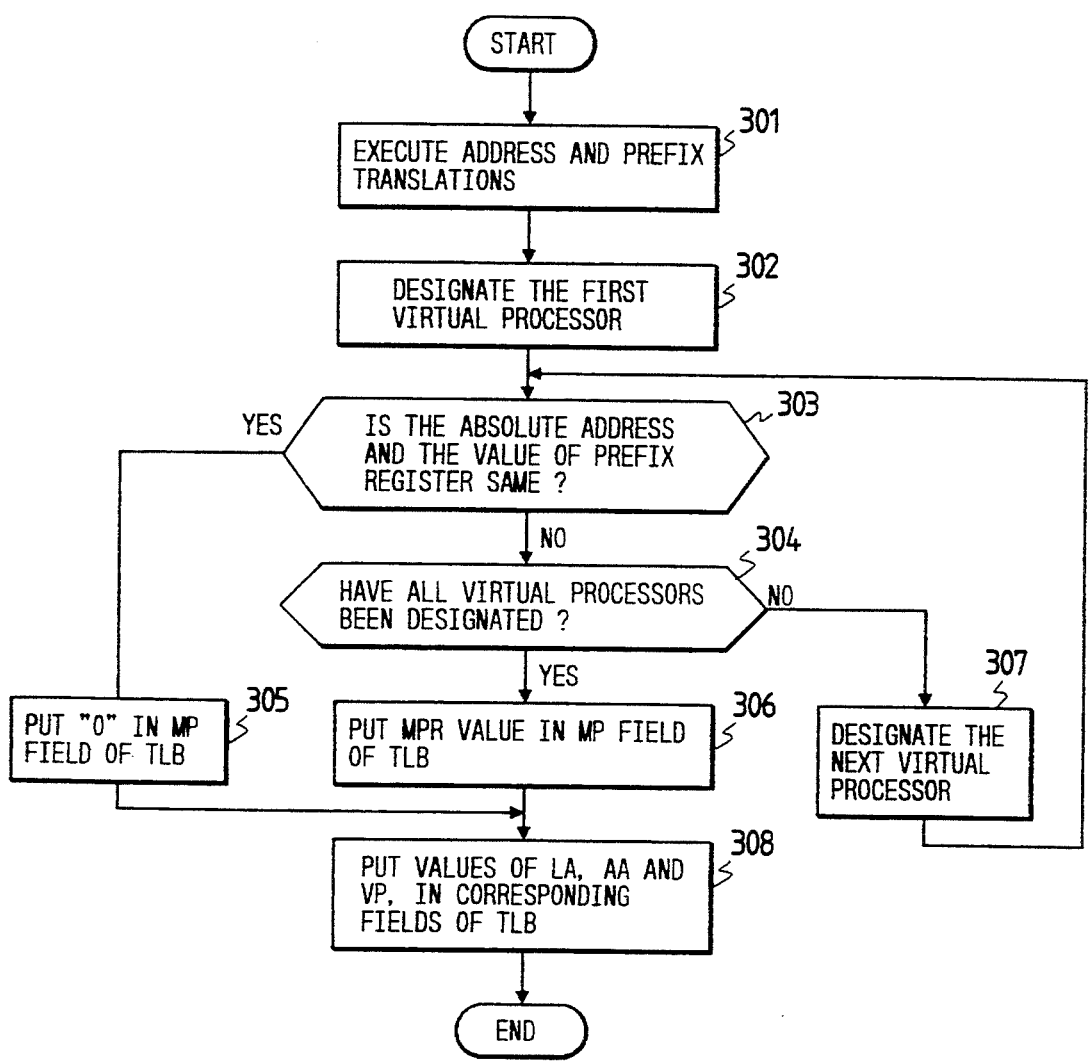
FIG. 8 is a flow chart for a process that puts address information in TLB entries in the address translation method of the present invention.

The following describes address translation according to the present invention. FIG. 7 is a block diagram for the address translator operating in the address translation method in view of the second concept described previously. FIG. 8 is a flow chart for a process that putting address information in the TLB entries in the address translation method of the present invention. The process shown in FIG. 8 is executed in a method 41-3 for the address translator in FIG. 7. The process in FIG. 8 is a follows.

Step 301: The logical address,is translated to absolute address by address translation and prefix translation.

Step 302: A first virtual processor is designated from among a plurality of the virtual processors forming the multi-processor.

Step 303: Comparison is made for the absolute address obtained in step 301 with a value of the prefix register of the virtual processor designated. If the both coincide, process moves to step 305. If not, process moves to step 304.

Step 304: Decision is made whether or not all the virtual processors forming the multi-processor have been designated. If so, process moves to step 306. If not, process moves to step 307.

Step 305: The MP field of the TLB has "0" put therein which indicates entry in the prefix area of the virtual processor.

Step 306: The MP field of the TLB has an MPR value put therein which indicates entry in the area common among the virtual processors.

Step 307: The next virtual processor forming the multi-processor is designated.

Step 308: The fields of the TLB have values put therein for identifying part of the logical address (LA field), the absolute address (AA field), and the virtual processor (VP field).

Figure 9:
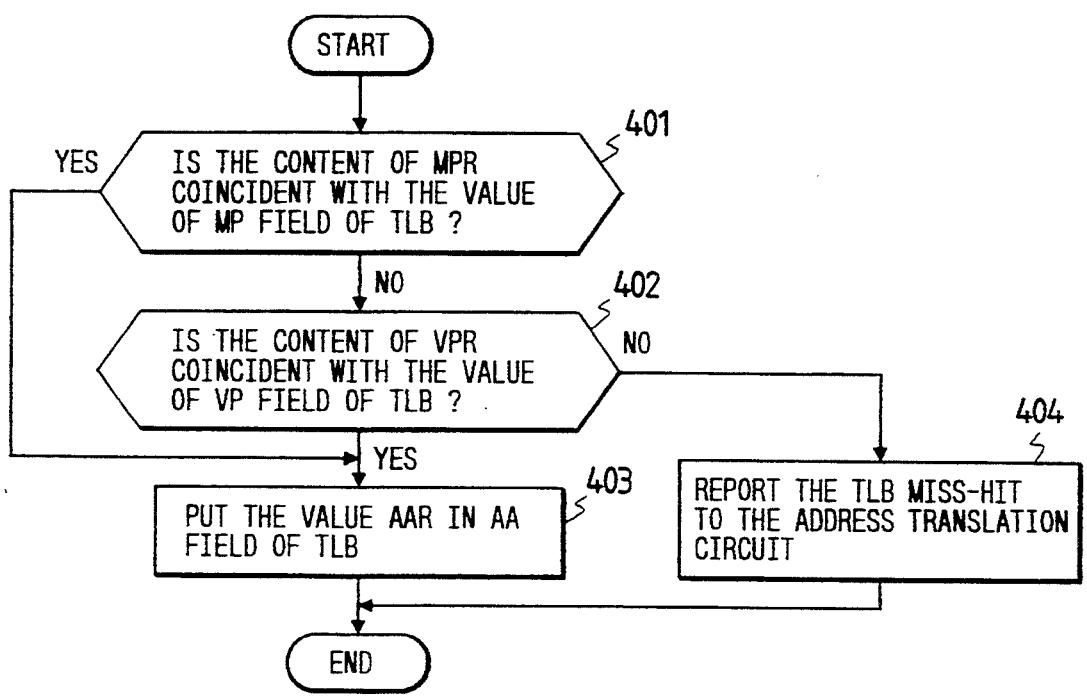
FIG. 9 is a flow chart for a process that can validate the entries in the TLB in the address translation method of the present invention.

FIG. 9 is a flow chart for a process that can validate the entries in the TLB in the address translation method of the present invention. The process shown in FIG. 9 is executed in a means 41-2 for validating in TLB entries for the address translator in FIG. 7. The process in FIG. 9 is as follows.

Step 401: The TLB is located with the logical address. Comparison is made for the value for identifying the virtual machine (contents of the multi-processor register MPR) with the value of the multi-processor field of the TLB. If the both coincide, process moves to step 403. If not, process moves to step 402.

Step 402: Comparison is made for the value for identifying the virtual processor (contents of the virtual processor register VPR) with the value of the virtual processor field of the TLB. If both values coincide, process moves to step 403. If not, process moves to step 404.

Step 403: As the address translation by the TLB was executed, the absolute address put in the TLB is set in the absolute address register.

Step 404: As the address translation by the TLB failed, the TLB miss-hit is reported to the address translation circuit. The address translation circuit executes address translation.

As described above, the embodiment of the present invention has the advantage that avoids decreasing performance of the virtual machines, as the TLB can have the TLB entries for the prefix areas of the virtual processors and the TLB entry for the area common among the virtual processors put therein, and as the TLB can be used to perform the address translation for the prefix area of each virtual processor and the area common among the virtual processors.

As described above in detail, the present invention has the advantage that the effective capacity and utilization of the TLB can be increased to avoid decreasing performance of the virtual machines, as entry of the prefix area of each virtual processor can be put in the TLB, and the TLB entry for the area common to the virtual processors can be used in common among the virtual processors.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An apparatus for translating addresses for virtual machines, comprising:

at least one virtual machine of a multi-processor system having a plurality of virtual processors;

means for holding a logical address of said virtual machine;

a translation lookaside buffer (TLB) for holding a pair of translators for translating the logical address to an absolute address of a real machine, holding a value for indicating whether or not an entry to said TLB corresponds to an area common among said plurality of virtual processors, and storing a value for identifying any of the virtual processors in said multi-processor system;

prefix translation means for translating a real address of said at least one virtual machine to an absolute address of said virtual machine;

address translation means for translating said logical address to a real address of said at least one virtual machine of said virtual processor;

comparison means for comparing a prefix value of any of said virtual processors input according to a system program with the absolute address obtained by said prefix translation means; and means for judging, on the basis of comparison results by said comparison means, whether or not the entry corresponds to the area common among said plurality of virtual processors.

2. An apparatus according to claim 1, wherein said apparatus includes a plurality of virtual machine, and said TLB further stores a value for identifying any of the virtual machines.

3. An apparatus according to claim 2, wherein said value for indicating whether or not the entry corresponds to the common area also identifies any of the virtual machines.

4. An apparatus according to claim 2, further comprising:

means for storing a value for identifying a currently running virtual machine and a value for identifying a currently running virtual processor;

comparison means for comparing the value for identifying said virtual machine with the value in said TLB for identifying the currently running virtual machine;

comparison means for comparing the value for identifying the currently running virtual processor with the value in said TLB for identifying any of the virtual processors; and means for validating the TLB entry.

5. An apparatus according to claim 1, wherein said TLB has a multi-processor field for storing value for indicating whether or not the entry corresponds to the common area and has a virtual processor field for storing said value for identifying any of the virtual processors.

6. In a virtual machine system comprising at least one virtual machine of a multi-processor system having a plurality of virtual processors, a method for translating a logical address of said virtual machine to an absolute address of a real machine, said method comprising the steps of:

translating the logical address of said virtual machine to the absolute address of said virtual machine by address translation means for translating the logical address of the virtual machine to a real address of the virtual machine and prefix translation means for translating the real address of said virtual machine to the absolute address of said virtual machine;

comparing a prefix value for each of said virtual processors input according to a system program with the translated absolute address;

inputting, to a translation look-aside buffer (TLB), a value for indicating that an entry corresponds to an area common among said virtual processors if the prefix value and the translated absolute address do not coincide as compared above; and inputting, to the TLB, a value for indicating that the entry is not for the area common among said virtual processors if the prefix value and the translated absolute address coincide.

7. A method according to claim 6, wherein the value for indicating whether or not the entry corresponds to the common area also identifies any of said virtual processors.

8. A method according to claim 6, wherein said virtual machine system includes a plurality of virtual machines, and said method further comprises a step for inputting, to the TLB, a value for identifying any of said virtual machines.

9. A method according to claim 7, wherein the TLB further stores a value for identifying any of said virtual processors.

10. A method according to claim 9, wherein the TLB has a multi-processor field for storing the value for indicating whether or not the entry corresponds to the common area and has a virtual processor field for storing said value for identifying any of said virtual processors.

11. A method according to claim 10, further comprising the steps of:

comparing a value for identifying a currently running virtual machine with a multi-processor field of the TLB as assigned by a virtual machine control program for controlling said virtual machine system;

comparing a value for identifying a currently running virtual processor with a virtual processor field of the TLB as assigned by the control program, and making effective entry to the TLB by determining if the value for identifying said virtual machine coincides with the multi-processor field of the TLB or if the value for identifying said virtual machine does not coincide with the multi-processor field of the TLB and the value for identifying said virtual processor coincides with the virtual processor field of the TLB.

* * * * *